US010017095B2

(12) United States Patent
Keast et al.

(10) Patent No.: US 10,017,095 B2
(45) Date of Patent: Jul. 10, 2018

(54) MOBILE SUPPORT AND LIFT SYSTEM

(71) Applicants: Jason Charles Keast, Escanaba, MI (US); James Charles DeStefano, Jr., Escanaba, MI (US)

(72) Inventors: Jason Charles Keast, Escanaba, MI (US); James Charles DeStefano, Jr., Escanaba, MI (US)

( * ) Notice: Subject to any disclaimer, the term of this patent is extended or adjusted under 35 U.S.C. 154(b) by 159 days.

(21) Appl. No.: 14/684,998

(22) Filed: Apr. 13, 2015

(65) Prior Publication Data
US 2015/0291076 A1 Oct. 15, 2015

Related U.S. Application Data

(60) Provisional application No. 61/979,550, filed on Apr. 15, 2014.

(51) Int. Cl.
*B60P 9/00* (2006.01)
*B60P 3/035* (2006.01)

(52) U.S. Cl.
CPC ................... *B60P 3/035* (2013.01)

(58) Field of Classification Search
CPC .. B60P 3/035; B60P 1/48; B60P 1/483; B60D 2001/008
USPC .............. 414/24.5, 462, 546, 555, 684, 911; 242/557
See application file for complete search history.

(56) References Cited

U.S. PATENT DOCUMENTS

| | | | | | |
|---|---|---|---|---|---|
| 3,860,193 | A | * | 1/1975 | Green | B60P 3/035 242/557 |
| 3,908,846 | A | * | 9/1975 | Brummitt | A01D 87/127 242/557 |
| 4,090,624 | A | * | 5/1978 | Krein | A01D 87/127 172/501 |
| 4,354,793 | A | * | 10/1982 | Perry | B60P 3/035 294/104 |
| 4,385,862 | A | * | 5/1983 | McVaugh | B60P 3/035 414/546 |
| 4,564,325 | A | * | 1/1986 | Ackerman | A01D 87/127 414/24.5 |
| 4,701,098 | A | * | 10/1987 | Bills | B60P 3/035 180/19.2 |
| 4,946,113 | A | * | 8/1990 | Riffle | B65H 49/325 172/269 |
| 5,178,505 | A | * | 1/1993 | Smith | A01D 87/127 414/24.5 |
| 5,685,686 | A | * | 11/1997 | Burns | B60R 9/06 224/282 |
| 5,833,424 | A | * | 11/1998 | Bales | A01D 87/127 414/24.5 |

(Continued)

*Primary Examiner* — Anna M Momper
*Assistant Examiner* — Lynn E Schwenning

(57) ABSTRACT

Disclosed is a mobile spool support system for transporting spools of a flexible elongate load such as cable or tubing on a transport vehicle. In some forms the system includes one or more lift arms for raising and lowering a spool rod. These arms are pivotally attached to a lift base that is utilized for supporting loads placed on the support system. A spool rod is utilized for supporting a spool containing the flexible elongate load on the spool and is seated on the lift arms. A mount interface is utilized for securing the system to the front or rear end of a transport vehicle. Deployable jacks are available in some forms to support the system against the ground.

20 Claims, 19 Drawing Sheets

(56) References Cited

U.S. PATENT DOCUMENTS

| | | | | |
|---|---|---|---|---|
| 5,993,197 | A * | 11/1999 | Alber | F23D 3/40 29/890.02 |
| 6,364,597 | B2 * | 4/2002 | Klinkenberg | B60P 1/4414 414/462 |
| 6,386,820 | B1 * | 5/2002 | Cunningham | B60P 1/5428 414/462 |
| 6,394,732 | B1 * | 5/2002 | Sweezey | A01D 87/122 414/24.5 |
| 6,435,801 | B2 * | 8/2002 | Talbott | B60P 1/4407 224/521 |
| 6,932,294 | B1 * | 8/2005 | Larson | B65H 49/32 242/390.5 |
| 7,530,523 | B1 * | 5/2009 | Murray | B65H 49/321 224/519 |
| 2001/0026756 | A1 * | 10/2001 | Mortimore | B60P 1/4442 414/556 |
| 2001/0036395 | A1 * | 11/2001 | Talbott | B60P 1/4407 414/462 |
| 2008/0085176 | A1 * | 4/2008 | Statkus | B60P 3/07 414/462 |

* cited by examiner

11

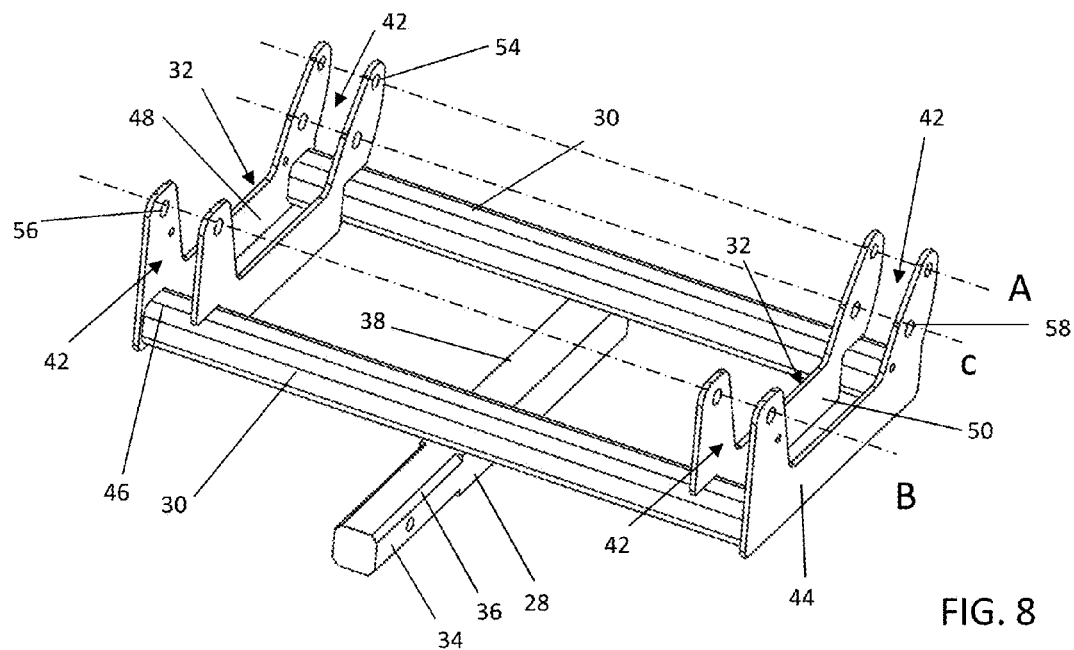
FIG. 8
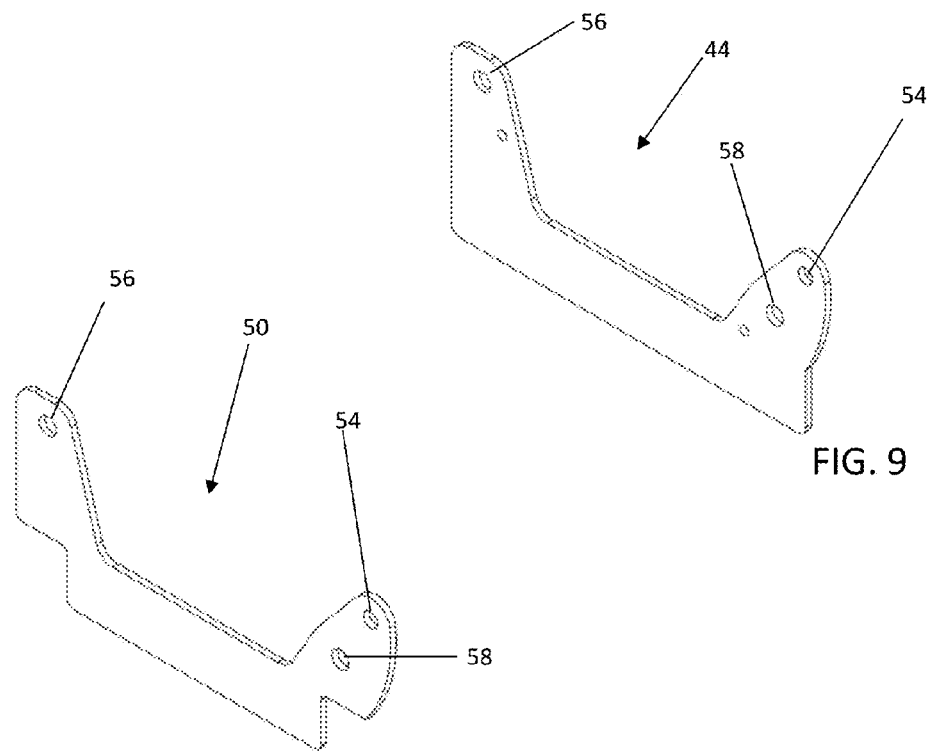
FIG. 9
FIG. 10

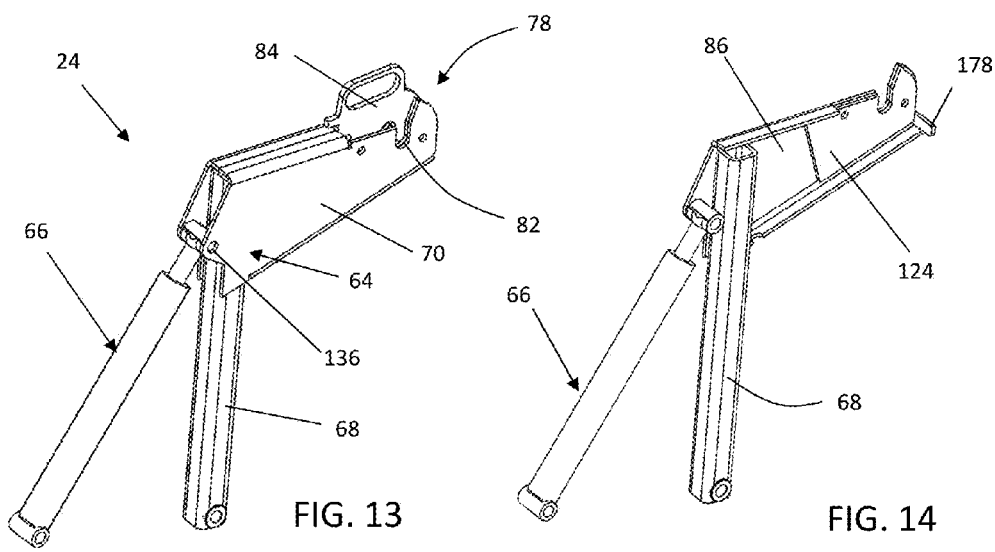
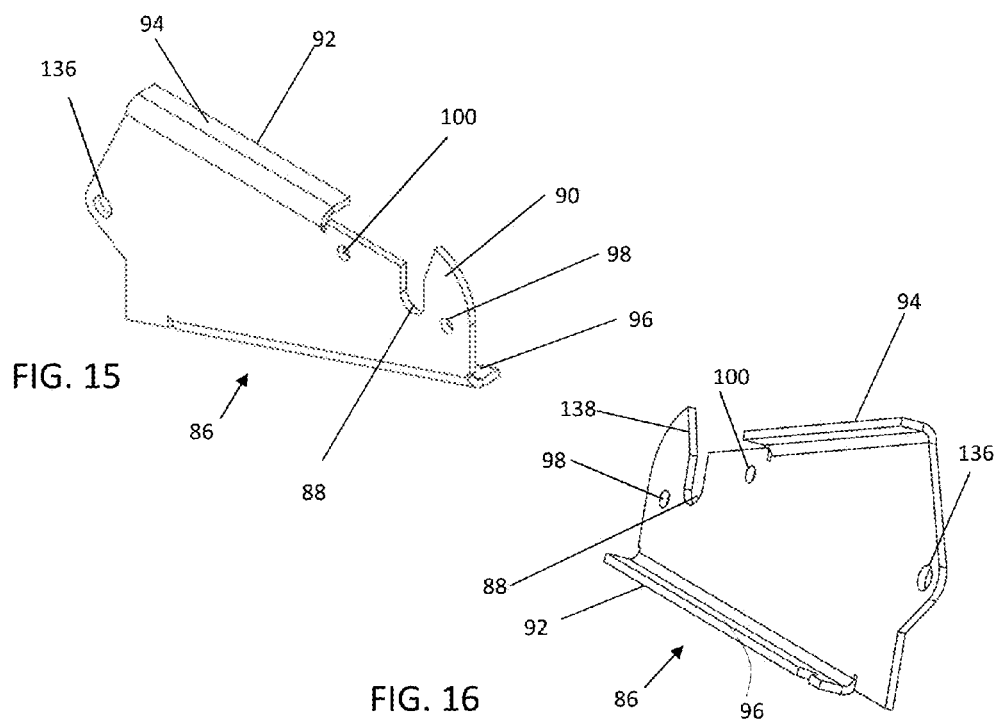

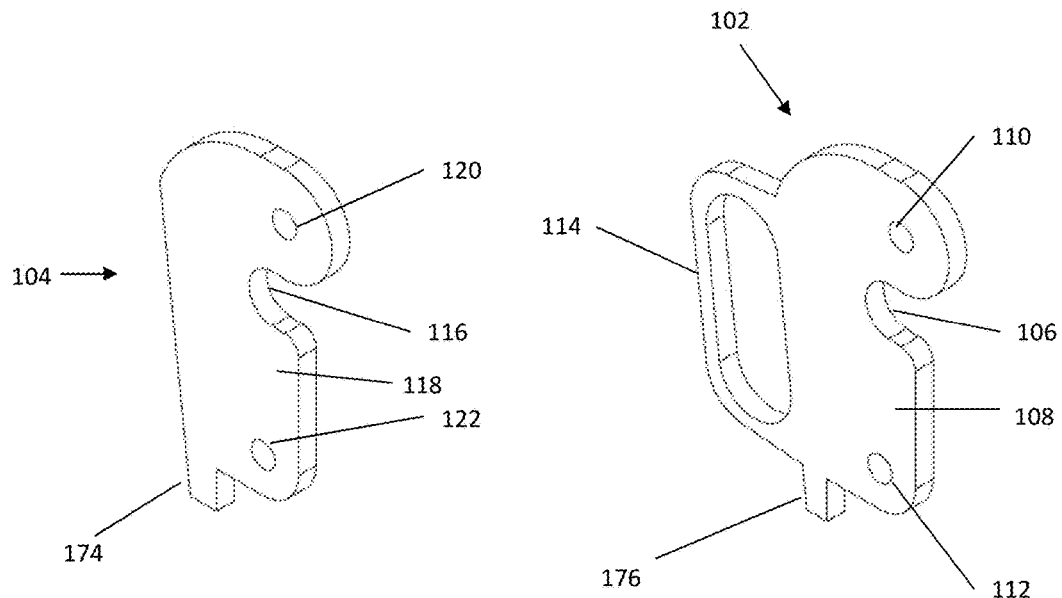
FIG. 21
FIG. 22
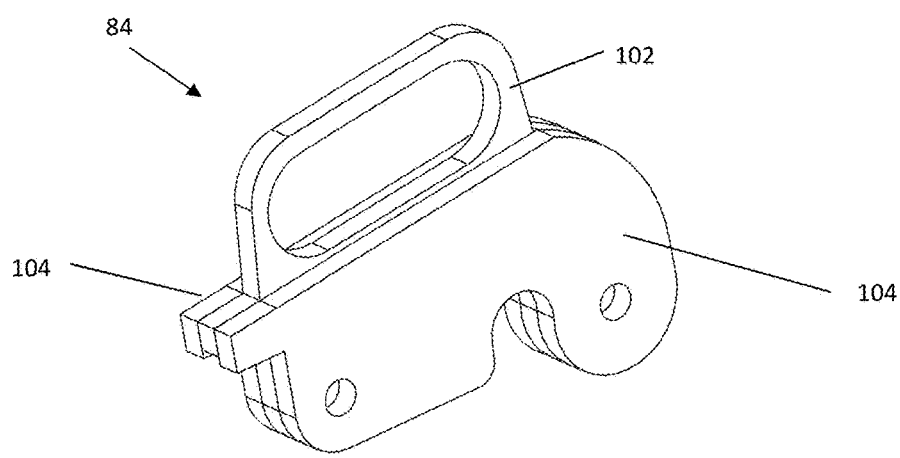
FIG. 23

MOBILE SUPPORT AND LIFT SYSTEM

CROSS REFERENCE TO RELATED APPLICATIONS

This application claims priority to U.S. Provisional Patent Application No. 61/979,550 filed Apr. 15, 2014, the entire disclosure of which is hereby incorporated by reference and relied upon.

BACKGROUND OF THE INVENTION

Field of the Invention

The invention relates generally to vehicle mounted support and lift systems, and more particularly to spool support and lift systems configured for mount to a transport vehicle for transporting an elongate load such as cable or tubing.

Description of Related Art

Utility cable lines are used extensively across our lands to carry electrical or light signals or energy from one location to another. For example, electric utility cables carry electricity to our homes, fiber optic cable to carry data communications for voice and video networks, and coaxial cable used as a transmission line for radio frequency signals for video and cable TV distribution, microwave transmission, and computer and instrumentation data connections. These cables span great distances to carry these transmissions from one place to another. A convenient mode of storing these cables prior to use is on large spools as seen in FIG. 1A-1D until they are unwound and traversed across aerial posts, through underground piping, or laid in channels dug in ground.

The prior art illustrates various types of equipment for handling these large and heavy cable spools. Most of this art is in the form of trailers connected by hitch or pintle plates to trucks with specialized mounts for holding the cable spools (FIG. 1A) on the trailer. Other art includes specialized mounts fixed to the bed of large trucks for the same purpose (FIG. 1B). Heavy equipment such as back hoes are often used to latch onto the spools or may have special spool handling arms to move the spools around (FIG. 1C). Many times these methods of moving the spools are impractical due to the effort required to move these machines to the work site or due to the cost of these machines. In addition, the size of the equipment can make it impossible to navigate to locations having limited access due to obstructions like trees, tight travel paths, or areas populated with people or other vehicles. A popular approach is to utilize specialized trailers to hold the spools as seen previously in FIG. 1A. These trailers are often extremely difficult to navigate in tighter spaces and also difficult when backing up since they typically have a short hitch to trailer wheel distance.

Workers responsible for installing cable underground or overhead are often expected to accomplish the task without the benefit of the equipment discussed previously. In other cases, the area where the cable is to be situated is often unsuited for this equipment. Too often these workers resort to manually moving or lifting the spools of cable into the back of a utility truck or other transport vehicle. This puts the worker at risk for serious injury, muscle strains, and fatigue.

What is needed are simple methods and machinery for lifting and moving these heavy spools with minimal effort. In addition, the machines should be configurable for use with standard transport vehicles such as pickup trucks without extensive adaptation to the vehicle. Finally the device should facilitate use in areas that are normally hard to navigate such as parking lots, wooded areas, or trails.

BRIEF SUMMARY OF THE INVENTION

A mobile support system with optional lift is disclosed herein. In preferred embodiments, the entire support system and load it carries is supported off the ground through a mount interface mounted to the front or rear of a transport vehicle. In preferred embodiments the system is substantially or wholly cantilevered from the front or rear of the vehicle.

In basic embodiments the mobile support system is configured only for the support of loads without a feature to raise and lower the load. In preferred embodiments the mobile support system also includes a lift mechanism powered by external energy or by user force. In preferred forms, the support system mount interface mounts in the trailer hitch receiver of a transport vehicle and in other forms is mounted directly to the frame, bumper, or rear plate of the vehicle by suitable measures such as welding or fasteners. Not only useful for cables, the system is useful for carrying a wide variety of flexible elongate materials such electrical and transmission lines, shielding, tubing, chain, and rope to name a few.

Most commonly the transport vehicle is a utility truck such as a pickup truck, however other embodiments of the system are suited for all-terrain vehicles useful for carrying loads such as a cable spool through extremely tight spaces and uneven terrain along trails or wooded areas. In preferred embodiments the support system includes a lift. The lift lowers towards the ground for the eased attachment of loads to the device. Once the load is attached, the lift elevates to move the load off the ground. Lifting mechanisms such as hydraulic cylinders are used in some embodiments to move the lift between lowered and upright positions. In other embodiments, the lift may utilize a winch and cable or pneumatic energy. The lifting mechanisms may operate by user force such as a hand pump or powered by other forms of energy such as electricity, solar, or gas. In preferred forms the lifting mechanism is powered by electrical sources coming from the transport vehicle or from a battery mounted on the lift but charged from the vehicle. These systems are most commonly 12 volt. The system includes various locks to maintain the load on the support system until ready to be removed. Methods for lifting a load using the device are also disclosed.

In a preferred embodiment, the support system includes a lift and is configured to lift spools typically wound with cable, wire, pipe, or other flexible elongate devices. The support and lift is typically pre-loaded and secured in the hitch receiver of the transport vehicle. Using a control mechanism to operate a hydraulic pump, the lift is lowered until the rod channels on the lift arms are generally aligned with the height of the central axis of the spool. The spool with a rigid elongate member in the form of a rod, tube or bar extended through the spool is then rolled so the spool is positioned between the lift arms. Alternatively, the transport vehicle is backed up to achieve similar alignment between spool and lift arms. The lift is elevated with rod generally seated within the rod cups. The rod locks are then lowered and pinned to prevent escape. Rod stops may be utilized to maintain the position of the rod within the lift assembly. In embodiments using hydraulics, the hydraulic system is activated using the control mechanism causing one or more hydraulic cylinders to raise the lift arms and elevating the spool and spool rod off the ground. Safety pins are used to secure the spool position in case of failure of the lift mechanism. The transport vehicle is then driven to the predetermined location. The user may choose to use the cable by rolling the cable off the spool while it is fully elevated or somewhat lowered, or may choose to lower the spool to the ground for removal. In the latter event, the rod lock safety pins are removed and the releasable rod locks are opened. Using a control mechanism, the lift arms are then lowered to clear the spool rod, or lowered just enough to slide the spool rod out. The transport vehicle and spool are separated followed by elevation of the lift arms back to the upright position and re-secured with lock pins.

In preferred embodiments the support and lift system includes one or more ground supports for use when the transport vehicle is not in motion. The ground supports are preferably retractable or removable and may be used for example to stabilize the lift system while loading or unloading the spools. In addition, the ground support relieves excessive forces on the transport vehicle during loading or unloading the spools. The ground supports are typically in the form of adjustable height pivot jacks that quickly pivot up and lock in position when not in use.

The mobile support and lift system may be configured to attach to a transport vehicle through a mount interface using a variety of connection options to the frame or bumper of the vehicle.

The mobile support and lift system in preferred embodiments is cantilevered from the front or rear of the transport vehicle. Use of the system negates the need for the transport vehicle to pull a trailer thereby significantly reducing fuel costs while also negating insurance costs associated with a trailer. The system negates the need for a loader since many forms of the system include a lift for lifting the spools directly off the ground into an elevated configuration. Other expenses are negated when using the system rather than a large truck and trailer such as reduced parking costs and training associated with workers obtaining a commercial driver's license.

Finally, the system effectively handles movement and transport of large and heavy cable spools reducing the physical stress imposed on the worker's body while also reducing the opportunity for physical injury.

BRIEF DESCRIPTION OF THE SEVERAL VIEWS OF THE DRAWINGS

These and other features and advantages of the present invention will become more readily appreciated when considered in connection with the following detailed description and appended drawings wherein FIGS. 1A through 31B are included.

FIG. 1A is a rear perspective view of a trailer in the prior art configured to transport a large spool of cable.

FIG. 6 is a perspective view of an embodiment of a mobile lift system in an upright position in accordance with a form of the present invention.

FIG. 7 are top, side, rear views of an embodiment of a mobile lift system in upright position in accordance with a form of the present invention.

FIG. 8 is a perspective view of an embodiment of a lift base in accordance with a form of the present invention.

FIG. 9 is a perspective view of a lateral plate in accordance with a form of the present invention.

FIG. 10 is a perspective view of a medial plate in accordance with a form of the present invention.

FIG. 11 is a perspective view of a hitch strut in accordance with a form of the present invention.

FIG. 12 is a perspective view of a crossbeam in accordance with a form of the present invention.

FIG. 13 is a perspective view of a lift arm assembly in accordance with a form of the present invention.

FIG. 14 is a perspective view of a forearm with portions removed in accordance with a form of the present invention.

FIG. 15 is an outside perspective view of an outer forearm plate in accordance with a form of the present invention.

FIG. 16 is an inside perspective view of an outer forearm plate in accordance with a form of the present invention.

FIG. 17 is a perspective view of an inner forearm plate in accordance with a form of the present invention.

FIG. 18 is a perspective view of a spacer leg in accordance with a form of the present invention.

FIG. 19 is a perspective view of a joiner block in accordance with a form of the present invention.

FIG. 21 is a perspective view of a side plate in accordance with a form of the present invention.

FIG. 22 is a perspective view of a handle plate in accordance with a form of the present invention.

FIG. 23 is a perspective view of a releasable rod lock in accordance with a form of the present invention.

FIG. 24 is a perspective view of a power top in accordance with a form of the present invention.

FIG. 25 is a perspective view of a power side in accordance with a form of the present invention.

FIG. 26 is a perspective view of a pan in accordance with a form of the present invention.

FIG. 27 is a perspective view of an alternative embodiment including a secondary hitch in the form of a ball hitch mounted to a hitch base in accordance with a form of the present invention.

FIG. 28 is a bottom perspective view of a preferred embodiment of a lift including both a front and rear hitch plate in accordance with a form of the present invention.

FIG. 29 is a top perspective view of a preferred embodiment of a lift including both a front and rear hitch plate in accordance with a form of the present invention.

FIG. 31B is a side view of a preferred embodiment of the mobile support and lift system in FIG. 31A illustrating an elevated primary hitch pitch plate for attachment to the transport vehicle and a lowered secondary hitch plate for attachment of a hitch accessory such as a pintle hitch for pulling of a trailer.

DETAILED DESCRIPTION OF THE INVENTION

Figure 1A:
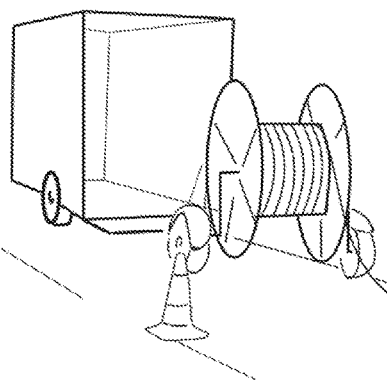
Figure 1B:
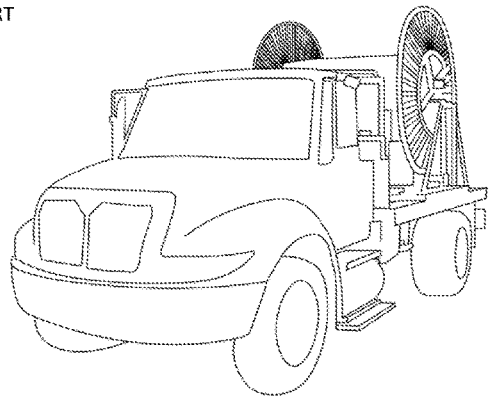
FIG. 1B is a front perspective of the bed of a truck in the prior art configured to transport a large spool of cable.
Figure 1C:
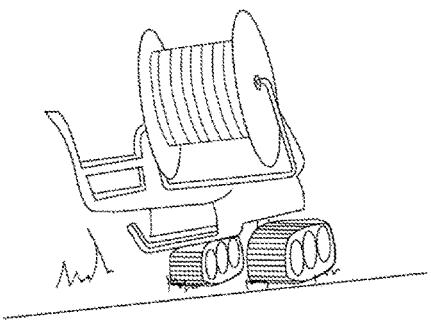
FIG. 1C is a perspective view of various heavy equipment in the prior art configured to transport spools of cable.
Figure 1D:
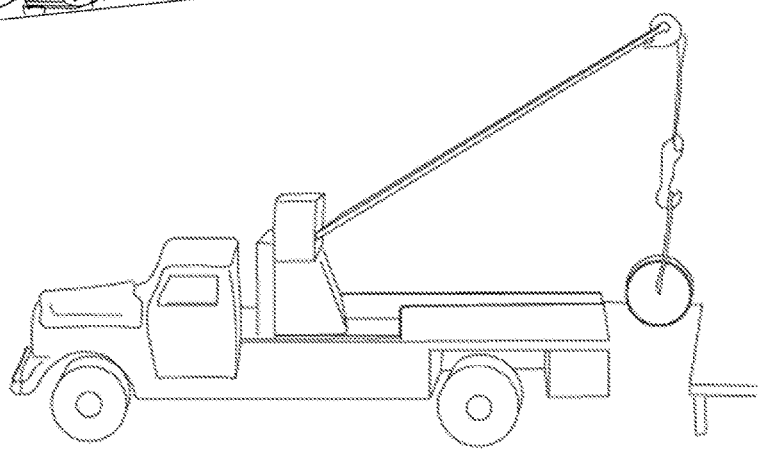
FIG. 1D is a top perspective view of a truck bed configured with a lift crane for moving loads off and on the truck bed.
Figure 2A:
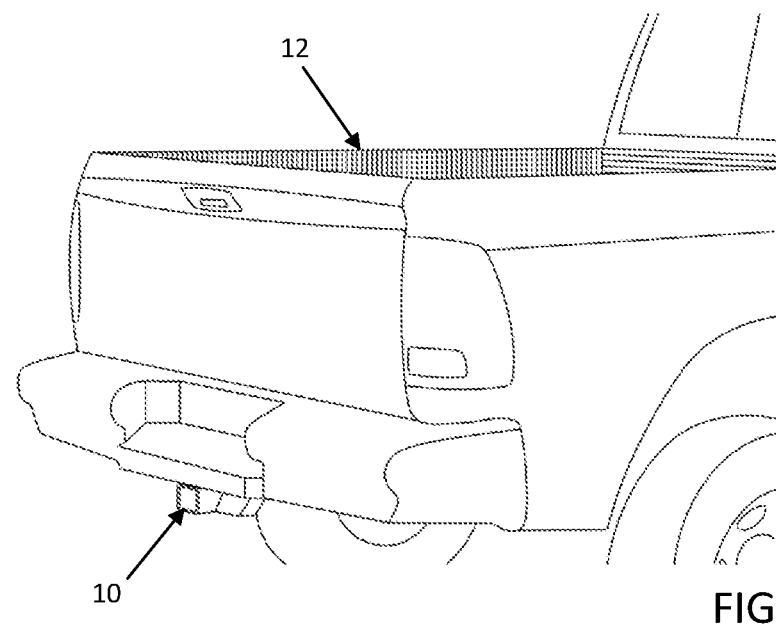
FIG. 2A is a rear perspective view of a hitch receiver in the prior art secured to the frame of a pickup truck.
Figure 2B:
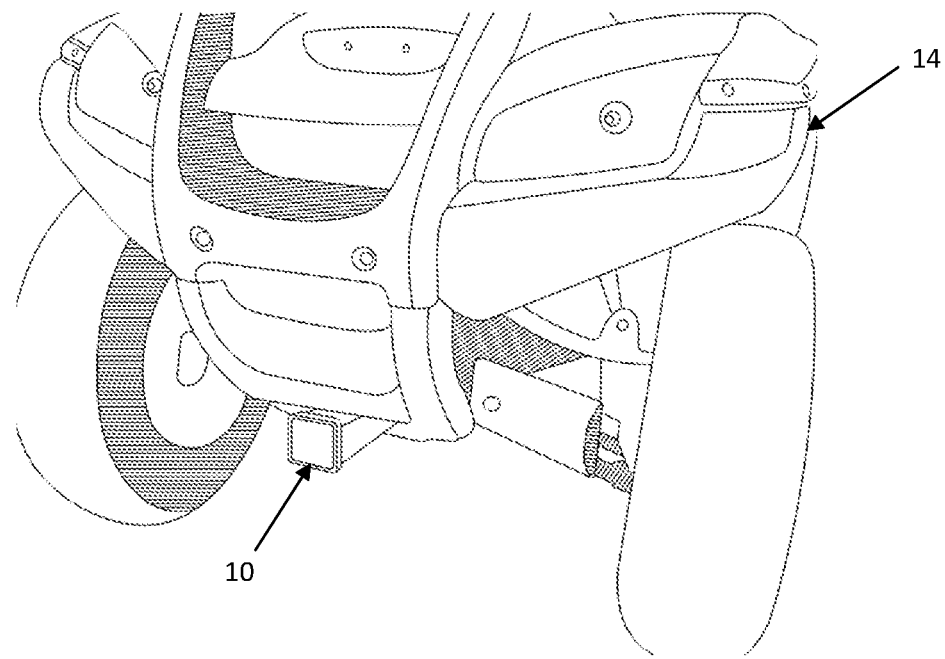
FIG. 2B is a front perspective view of a hitch receiver in the prior art secured to the frame of a utility task vehicle.
Figure 2C:
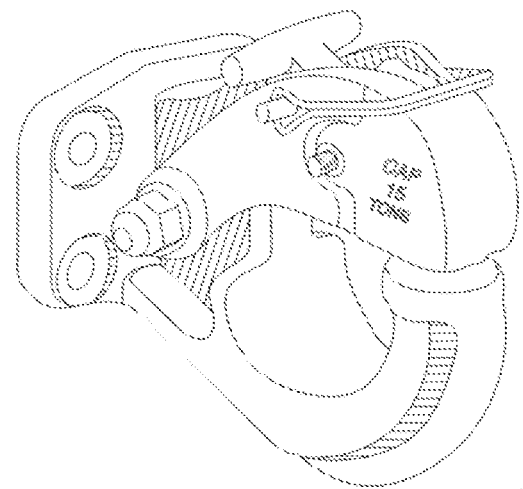
FIG. 2C is a perspective view of a pindle hitch used in the prior art.
Figure 2D:
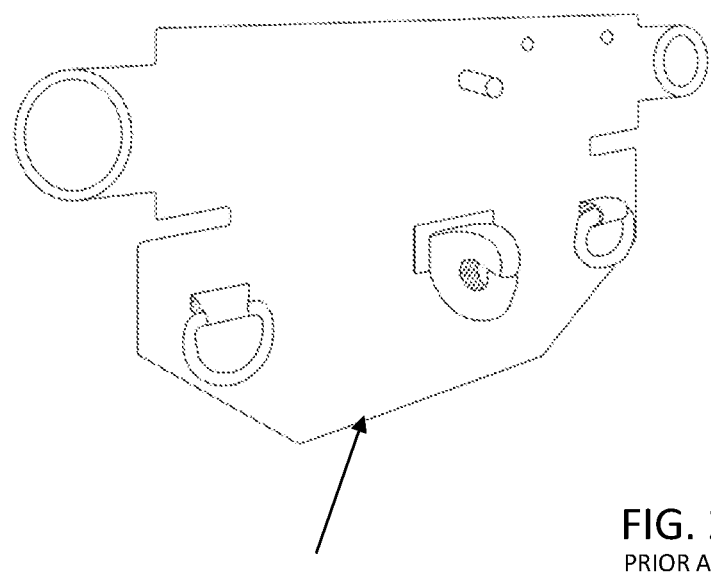
FIG. 2D is a perspective view of a pindle hitch bolted to a rear hitch plate of a truck.

In a preferred embodiment the disclosed device is in the form of a support with lift configured for mounting to a transport vehicle. The transport vehicle may be a utility truck, pickup truck 12 (FIG. 2A), or other vehicle sufficient to handle the weight of the support system and any loads applied to it. The transport vehicle may include utility transport or all-terrain vehicles (UTVs or ATVs) 14 (FIG. 2B). Unlike methods used in the prior art, in preferred embodiments the disclosed system is secured to standard towing or connection features on the transport vehicle without the need for alterations to the vehicle. For example, the system may be mounted within or to a trailer hitch receiver 10 as illustrated in FIGS. 2A and 2B, or to a standard or custom mounting plate 11 on a transport vehicle as illustrated in FIG. 2D. The vehicle's mounting plate in FIG. 2D is utilized in the illustration for mounting of a pintle hitch such as illustrated in FIG. 2C. In preferred embodiments, the disclosed mobile support and lift system is configured with a standard mount interface 95 in the form of a hitch plate (FIG. 28) for bolting or welding to the transport vehicle's mounting plate or in the form of a hitch strut 28 (FIG. 8) for insertion into the vehicles hitch receiver.

Figure 4A:
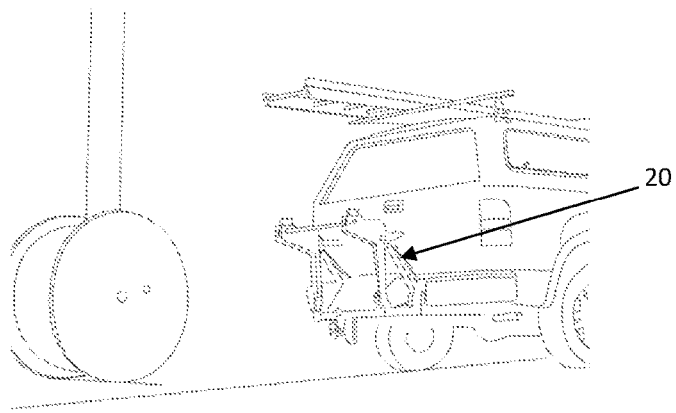
FIG. 4A is a perspective field view of a preferred embodiment of the mobile support and lift system secured to the hitch of a truck and in an elevated configuration in preparation for loading a spool/reel of cable in accordance with the present invention.
Figure 4B:
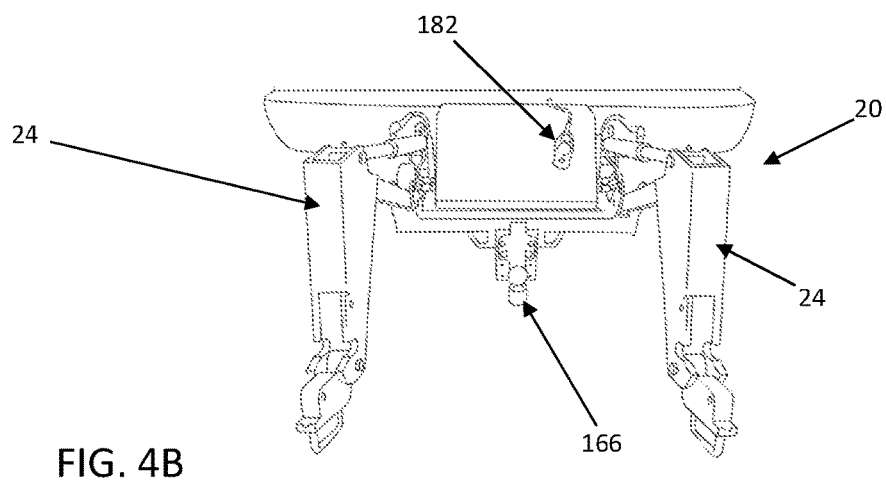
FIG. 4B is a top perspective field view of a preferred embodiment of a mobile support and lift system in a lowered configuration in preparation for loading a spool.
Figure 4C:
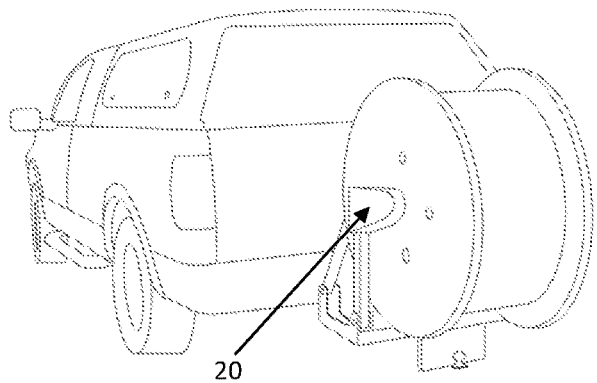
FIG. 4C is a rear perspective field view of the mobile support and lift system loaded with a reel of cable prepared to transport to the job site.
Figure 4D:
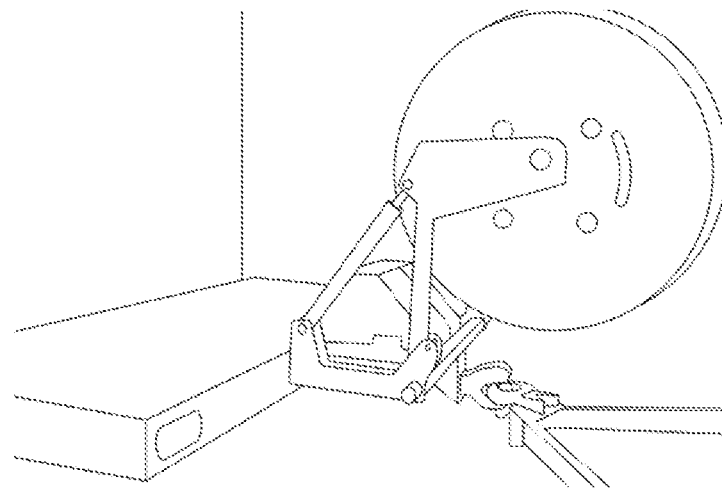
FIGS. 4D and 4E are perspective views illustrating an embodiment of a mobile support and lift system with cable spool secured to a truck with utility trailer connected to said mobile support and lift by pintle hitch.
Figure 4E:
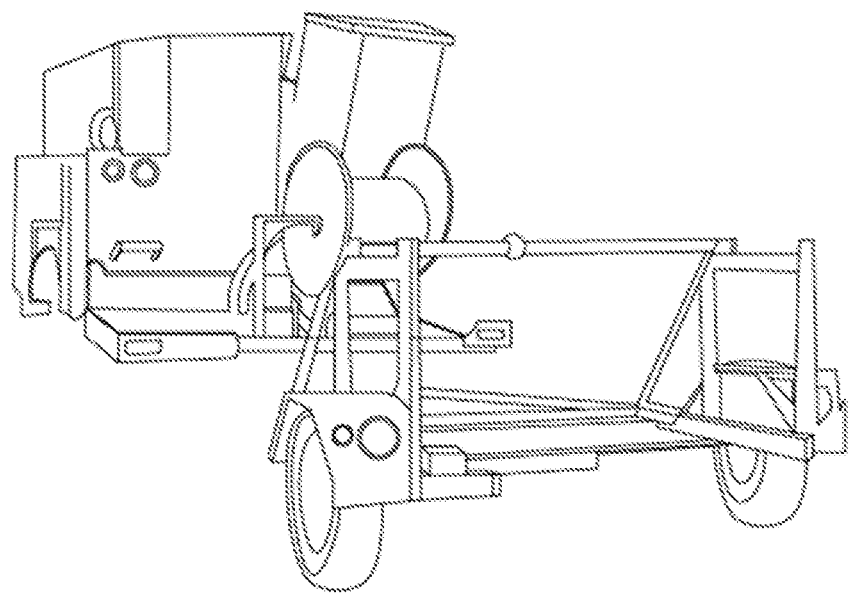
Figure 4F:
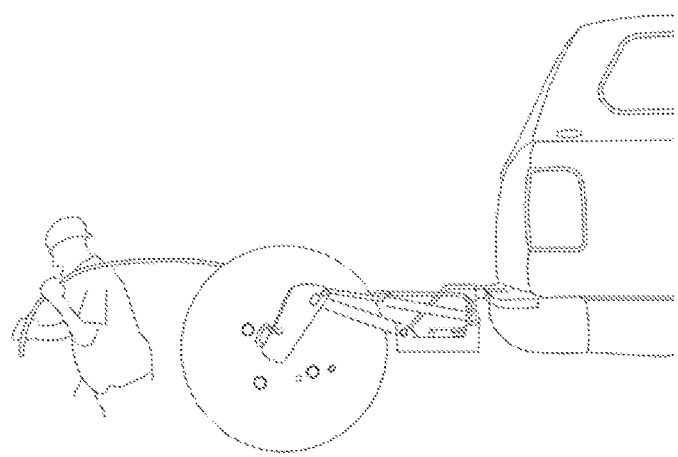
FIG. 4F is a side perspective view of a mobile support and lift system utilized in the field in a lowered configuration adjacent a worksite.
Figure 4G:
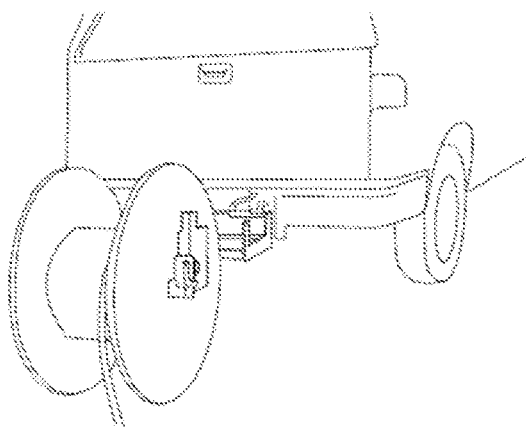
FIG. 4G is a rear perspective field view of a mobile support and lift system adjacent a worksite illustrating a worker unreeling cable from the spool.
Figure 4H:
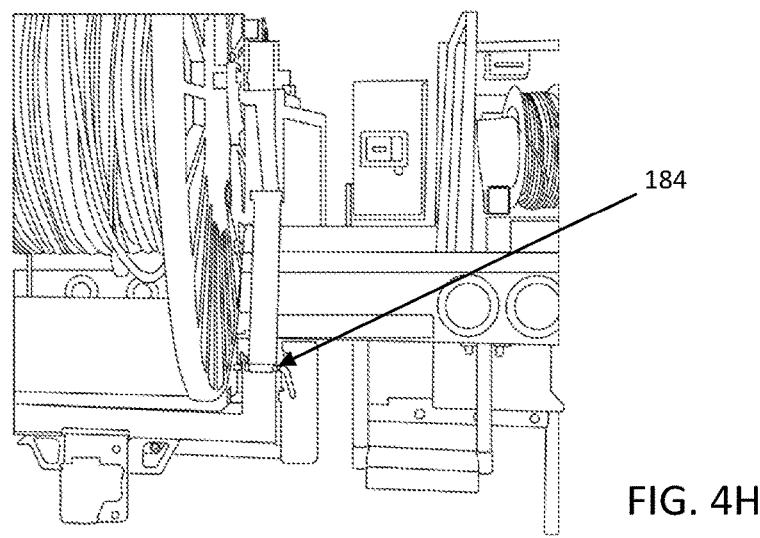
FIG. 4H is a rear perspective field view of a mobile support and lift system secured to a truck in an elevated configuration with lock pins engaged.

FIGS. 4A through 4H illustrate various views of embodiments of the mobile support and lift system during operational testing. The system in FIG. 4A illustrates the system attached to a transport vehicle in an elevated configuration arriving at a job site in preparation to load a spool of cable. As illustrated in FIG. 4B, the lift arms 24 are lowered such that the spool can be loaded directly from the ground. Once loaded on the lift, the system elevates the spool in preparation for transport as illustrated in FIG. 4C. FIGS. 4D and 4E illustrates an embodiment whereby the system is secured to a utility transport vehicle and a trailer is attached to a secondary hitch on the system at a mount interface enabling transport of additional cable spools, other supplies, or tools. FIGS. 4F and 4G illustrate the transport vehicle and a mobile support system parked at a job site not easily accessed by truck and trailers seen in the prior art. Here the lift is lowered for convenience of the user and cable is pulled from the reel by the user for convenient placement of the cable in the trench. In FIG. 4H a lift is returned to an elevated configuration. One or more locks 184, here in the form of a locking pin, is engaged to prevent unintentional lowering of the lift in case of failure of the lifting system. An example of a failure may include hydraulic or pneumatic leaks or failure of a lift cable in cable elevated systems.

The lift may be scaled to handle reels and reel loads of various weights and sizes while also considering the capacities of the transport vehicle and attachment hardware and clearances needed between the device, the load, the transport vehicle, and the ground. In preferred embodiments, the width between lift arms is about 24 inches or 40 inches. The lift arms are elongated sufficient to prevent the outside diametrical edges of the spools from interfering with portions of the lift device.

Figure 5A:
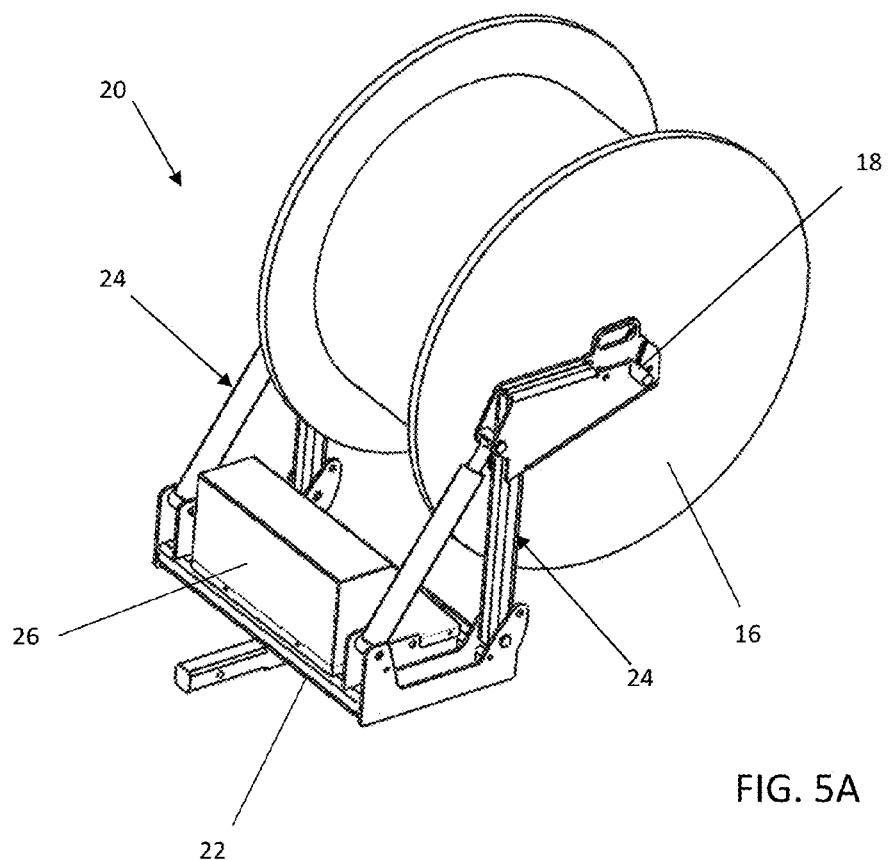
FIG. 5A is a perspective view of an embodiment of a mobile lift system supporting a spool of cable in an upright position in accordance with a form of the present invention.
Figure 5B:
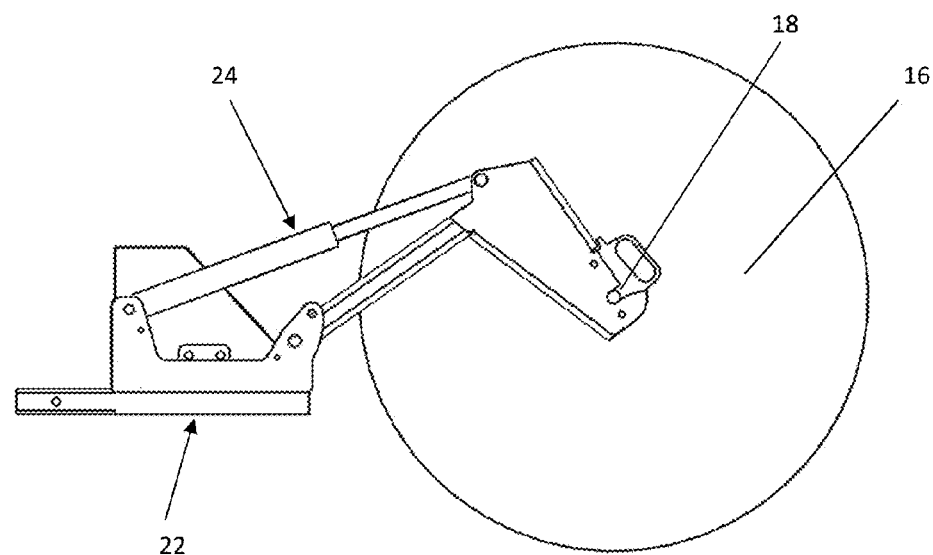
FIG. 5B is a side view of an embodiment of a mobile lift system supporting a spool of cable in a lowered position in accordance with a form of the present invention.

A preferred embodiment of one form of the mobile support and lift 20 system with spool 16 load attached is illustrated in FIG. 5A in an elevated configuration. Here the spool 16 is supported by a generally horizontal spool rod 18 for transport by the transport vehicle to a new location or for the elongated element stored on the spool 16 to be pulled from the spool 16 for use. This elevated configuration provides some spacing from the back of the vehicle wherein the gate of the pickup or rear door may be opened and accessible to access contents. A side view of this same embodiment is illustrated in FIG. 5B in a lowered configuration for loading or unloading of the spool. Here the spool may be lowered to or from the ground or other resting surface.

Figure 6:
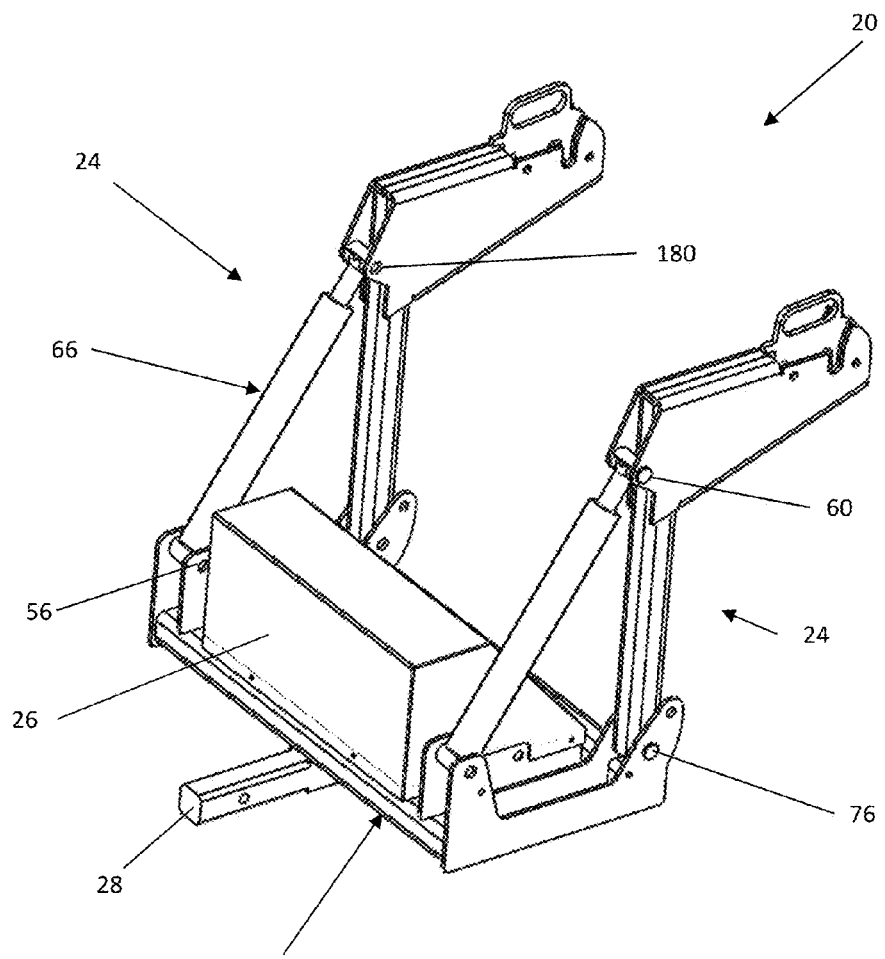
Figure 7:
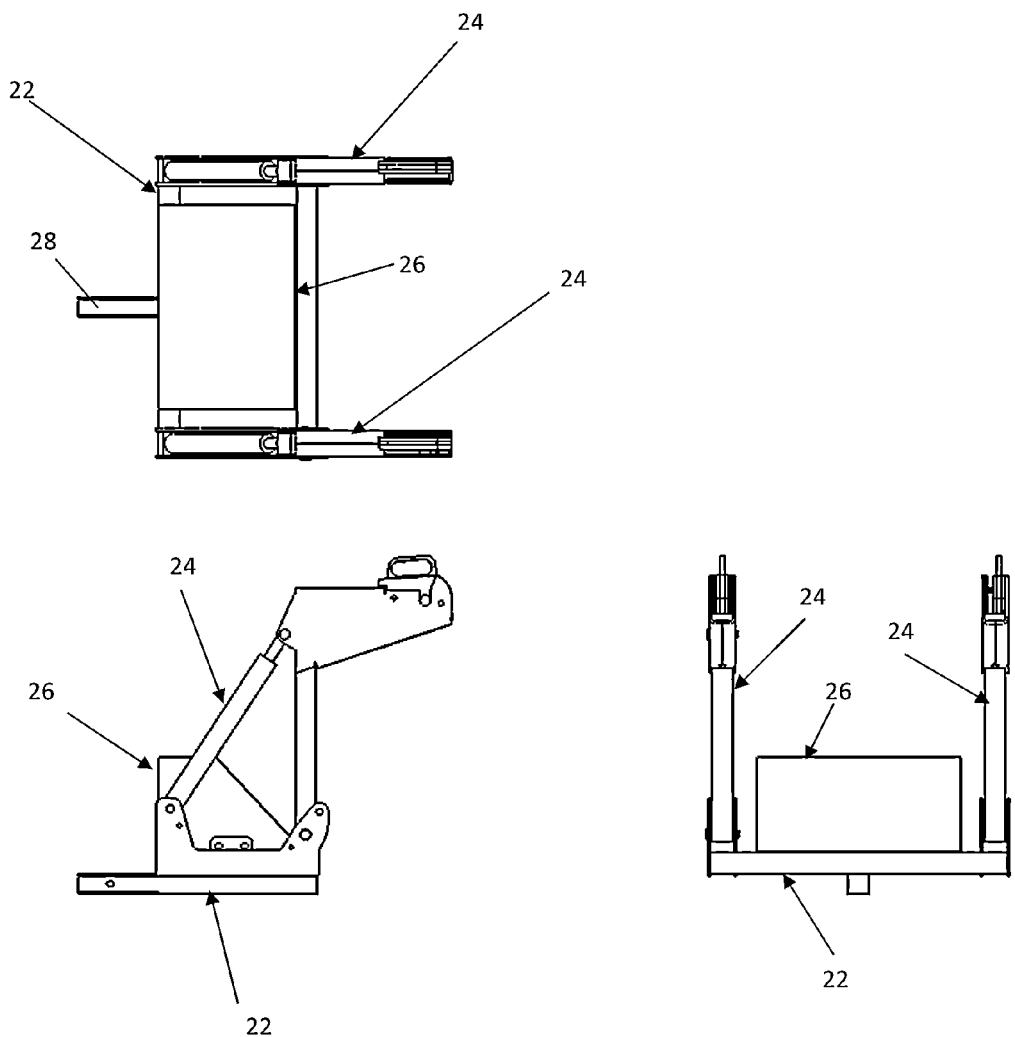
Figure 11:
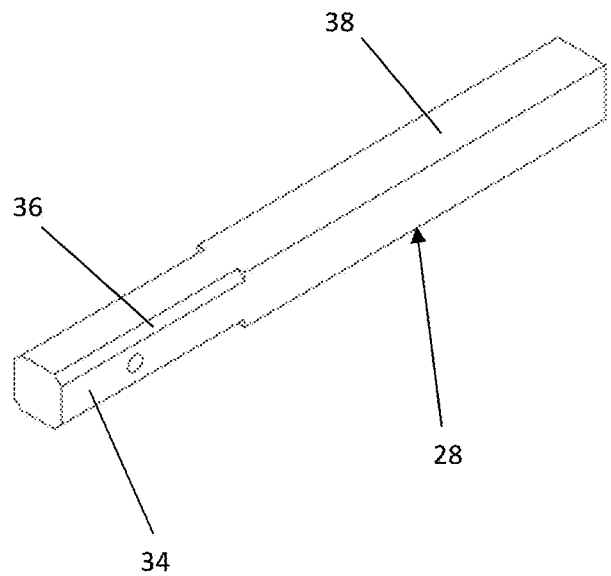
Figure 12:
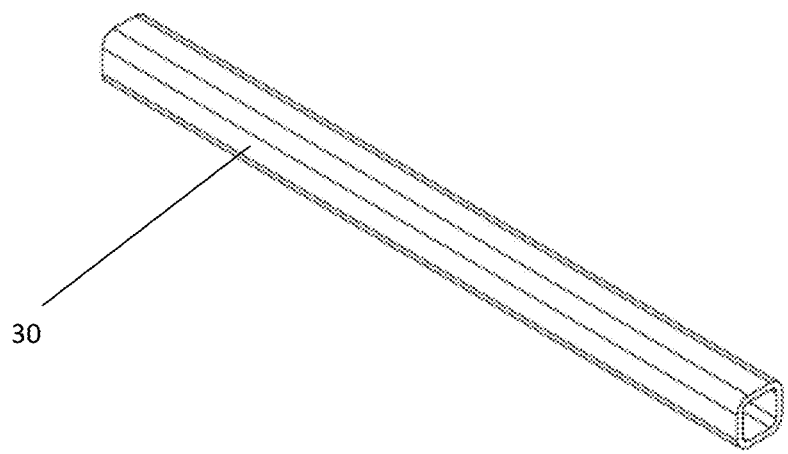

FIG. 6 illustrates a form of the mobile support system 20 in the elevated configuration without the spool or spool rod attached. The device comprises a lift base 22, a pair of opposed lift arms 24, and power unit 26. Top, side, and rear views of the support system 20 are illustrated in FIG. 7.

The lift base is illustrated in FIG. 8 and comprises a sturdy platform for supporting the lift arms 24. The lift base 22 comprises a hitch strut 28 (FIG. 8,11), a pair of cross beams 30 (FIG. 8, 12), and a pair of arm cradles 32. The hitch strut bears the weight of the lift base and the loads upon it and transfers it to the transport vehicle through a variety of possible interfaces. For example, in this embodiment the neck 34 of the hitch strut 28 is shaped and sized to be received into a 2 inch hitch receiver. In this embodiment the hitch strut 28 is solid to withstand the expected loading forces demanded by the weight of the spool 16 and the load the spool carries. In other embodiments the hitch strut 28 may be tubular when less loading is required. The neck 34 of the hitch strut 28 is sloped at 36 to ease entry into the trailer receiver 10. The neck 34 also includes a hole placed in a standard position for housing a removable pin that keeps the neck 34 of the hitch strut 28 from releasing from the trailer receiver 10. Distal from the neck 34 is the hitch body 38 of the hitch strut 28. A pair of spaced cross beams 30 is transversely secured by bolts, weld or other means at their midpoint to the top of the hitch body 38 at about 90 degrees. Here, each cross beam 30 is in the form of a tube.

Illustrated in FIG. 8, a pair of arm cradles 32 are secured at the ends of cross beam 30. Forming the arm cradle 32 is lateral plate 44 (FIG. 9) and medial plate 50 (FIG. 10). Lateral plate 44 is shaped to cover the ends of cross beam 30 while extending sufficiently beyond the beam 30 outer surface for securing with a weld bead. A weld bead (not shown) is formed between the outer cross beam surface 46 and inner face 48 of the lateral plate 44.

Spaced medially from each lateral plate 44 (FIG. 9) is a medial plate 50 (FIG. 10) therein defining between the plates the lift pocket 42 sized for a lift arm 24 to articulate therebetween. Each lateral 44 and medial plate 50 comprises a pair of lower pivot holes and a lock hole 54. The lower pivot holes are spaced on each plate and consist of a proximal pivot hole 56 and a distal pivot hole 58. Proximal pivot holes 56 from each plate are aligned along axis B whereas distal pivot holes 58 are aligned along axis A, and lock holes 54 are generally co-axially aligned between the lateral 44 and medial plates 50 along axis C. A weld bead (not shown) joins a face of the medial plate 50 to the outer surface 46 of each cross beam 30. Similarly, a weld bead (not shown) joins a medial face of each lateral plate 44 to the outer surface of the corresponding cross beam 30. In this embodiment, a lift arm 24 comprising a stabilizer arm 64 and a power arm 66, pivot within a lift pocket 42 which is defined by a lateral plate 44 spaced from a medial plate 50. Given this arrangement, each power arm 66 and the corresponding stabilizer arm 64 pivot generally within a common plane.

Each lift arm 24 (FIG. 13) articulates about a plurality of pivot members. In a preferred embodiment, the pivot member is in the form of a hardened steel pivot bolt or pin as illustrated at 186 in FIG. 20B. The pivot bolt 186 comprises a bolt shoulder 134 and bolt retainer 140 here in the form of a groove to house a retainer clip (not shown) to secure the pivot bolt in place.

The lift arm 24 comprises a stabilizer arm 64 and a power arm 66. In this embodiment the stabilizer arm 64 further comprises a spacer leg 68 portion and a forearm 70 portion.

Figure 18:
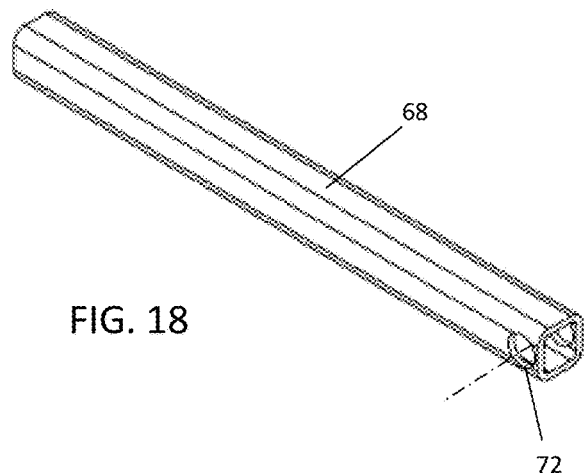
Figure 20A:
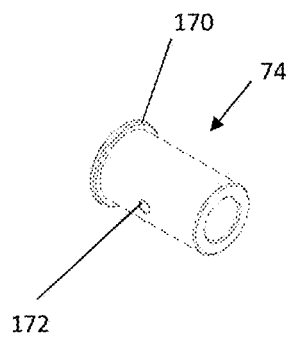
FIG. 20A is a perspective view of a pivot bushing in accordance with a form of the present invention.
Figure 20B:
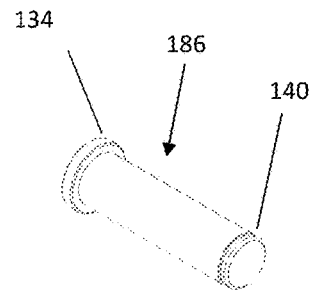
FIG. 20B is a perspective view of a pivot member in accordance with a form of the present invention.

The spacer leg 68 (FIG. 18) is in the form of an elongated support tube with a pivot aperture 72 located at an inferior end and having a sufficient size to house a pivot bushing 74 (FIG. 20A). The pivot bushing 74 has an internal diameter sufficient to house a lower pivot bolt 76. The pivot bushing 74 is utilized to reduce contact stresses between the spacer leg 68 and pivot bolt 76 as well as to reduce wear between opposing articulation surfaces at the pivot. For this reason, the pivot bushing 74 is preferably manufactured from a low wear material such as bronze having sufficient strength. The pivot bushing 74 may include a bushing shoulder 170 and a bushing lock 172 to secure the bushing 74 in place. The same or similar pivot bushings and pivot bolts are utilized at other pivot points on the system.

As illustrated in FIG. 13, the forearm 70 extends transversely from the superior end of the spacer leg 68 and comprises a grasp 78 configured to secure itself to the load to be imparted on the support system 20. In other embodiments, the grasp may be configured for securing to a wide range of loads of various shapes and sizes. In this embodiment, the grasp 78 is in the form of a rod lift that is effective at holding and lifting a generally horizontal cable spool rod 18. The rod lift comprises a rod channel 82 and a releasable rod lock 84 situated to prevent the rod 18 from escaping the rod channel 82 during lifting or transport. At the proximal end of the forearm 70 is an upper pivot hole 136 (FIG. 13, 15) sized to capture an upper pivot bolt 60 (FIG. 6) that pivotably joins the stabilizer arm 64 to the power arm 66.

In this embodiment the forearm 70 is manufactured from a plurality of sheet metal plates joined by welds and fasteners to ensure sufficient strength and durability. One of these plates, the outer forearm plate 86, comprises several features and is illustrated in FIGS. 15-16. A rod groove 88 is located at the distal end of the outer forearm plate 86 and sized in diameter to seat the spool rod 18 to be lifted. At the distal end of the rod groove 88 is a rod tooth 90 of size sufficient to contain the spool rod 18 in rod groove 88. The rod tooth 90 comprises an angled entry 138 leading into the rod groove to help slide a misaligned spool rod 18 into the rod groove 88. Outer forearm plate 86 comprises two elongated flanges utilized to stiffen and strengthen the plate 86. A superior flange 94 and an inferior flange 96 bound two sides of plate 86. Spacer leg 68 is joined by welds to the inner walls of opposing forearm plates 86. A flange base 92 at the end of the flanges 94, 96 provides one or more surfaces for a weld to join the opposing outer forearm plates 86. A first pivot hole 98 in each forearm plate 86 is positioned near rod groove 88 as is a first lock hole 100. First pivot hole 98 is sized to pass handle pivot pin (not shown) which alternatively may be in the form of a bolt. The handle pivot pin provides a pivot point for a releasable rod lock when pivoting between a locked and open position. First lock hole 100 is sized to pass a handle lock pin (not shown) which retains the rod lock 84 in a position to retain the spool rod 18.

Figure 28:
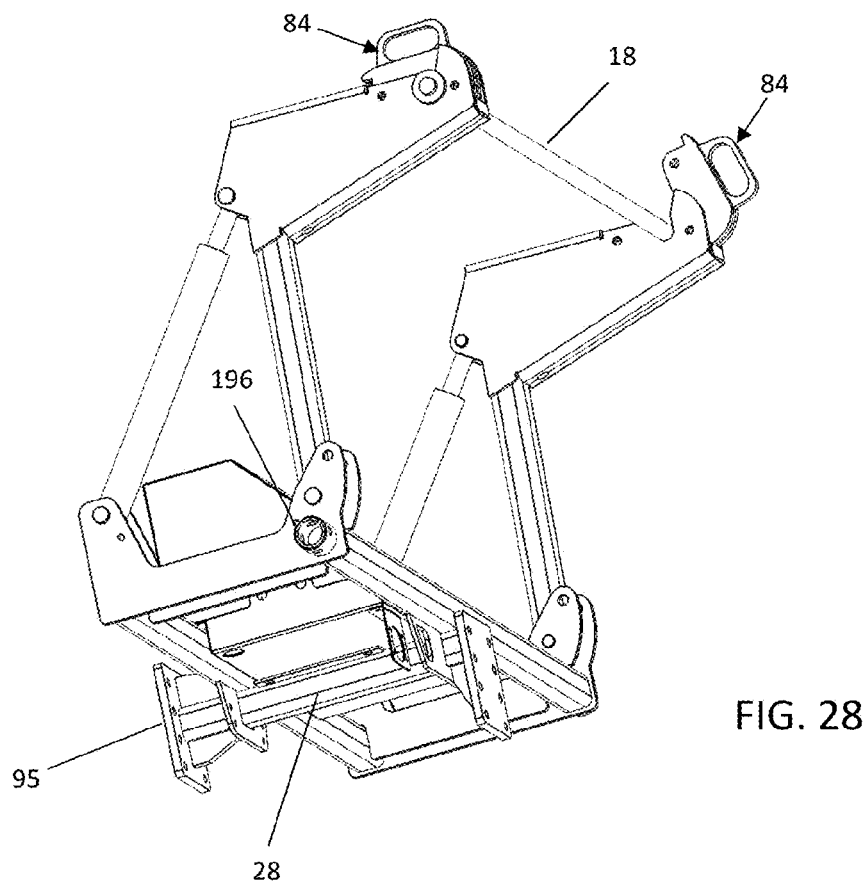
Figure 29:
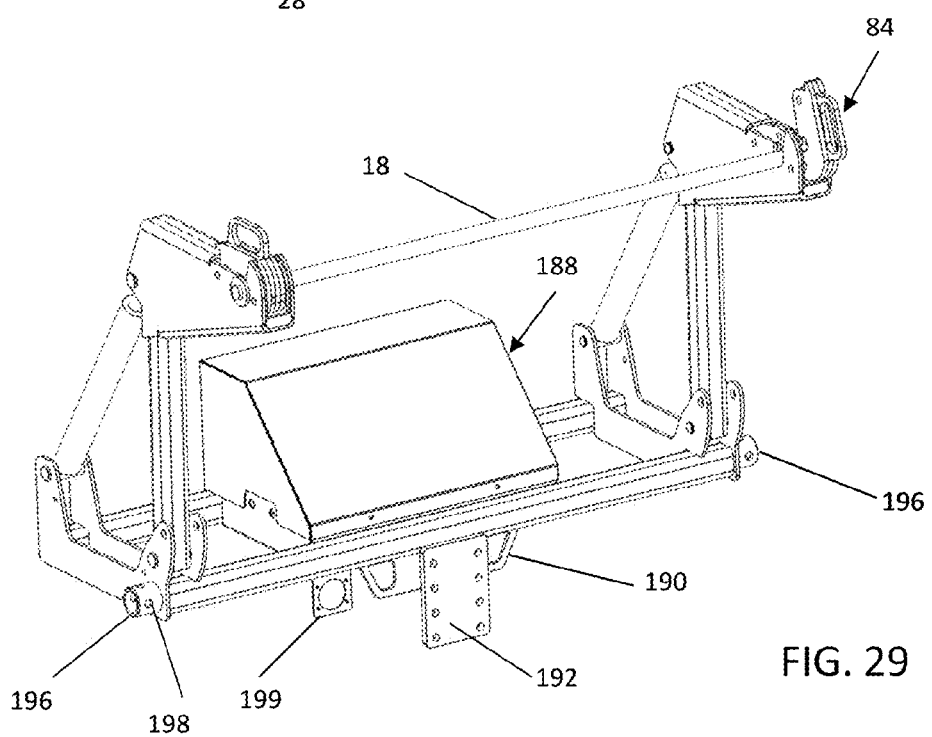

As seen in FIGS. 21-23 the releasable rod lock 84 in this embodiment comprises a handle plate 102 placed between and welded to two side plates 104. With similar features to outer forearm plate 86, handle plate 102 comprises a second rod groove 106, a second rod tooth 108, a second pivot hole 110, and a second lock hole 112. In addition, it comprises handle stop 176. Integrated into the top of handle plate 102 is a raised handle 114 for pivoting the releasable rod lock 84 off the spool rod 18 about a pivot pin therein providing a path for rod 18 to be removed. Likewise, side plate 104 comprises a third rod groove 116, a third rod tooth 118, a third pivot hole 120, and a third lock hole 122. In addition, side plate 104 includes a side plate stop 174. A pivot pin (not shown) through the pivot holes provides a rotation point for the rod lock to secure or release the spool rod. A handle lock pin (not shown) through the lock holes encloses the rod lock over the spool rod therein preventing its release. The stops 174, 176 are positioned to assist alignment of the lock holes extending between the handle lock and outer forearm plate for easy placement of lock pins. FIGS. 28-29 provide an illustration of the releasable rod lock 84 in a closed position around the spool rod 18 on one side and open for removal of the spool rod 18 on the other side.

Figure 17:
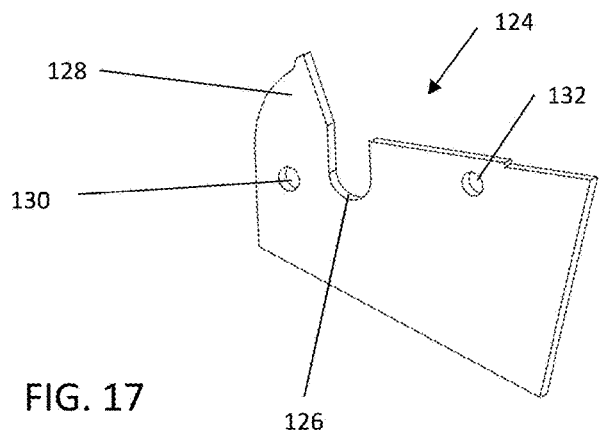

FIG. 14 provides a view of the forearm with an outer forearm plate and rod lock handle removed. Inner forearm plate 124 (FIG. 17) is welded to the inner wall of each outer forearm plate 86 to provide added strength and rigidity to plate 86 for handling heavier loads. The inner forearm plate 124 comprises similar features of the outer forearm plate 86 including a fourth rod groove 126, a fourth rod tooth 128, a fourth pivot hole 130, and a fourth lock hole 132.

In some forms, the lift arms may be raised and lowered by use of a powered or hand driven winch (not shown) that is secured to the lift base by bolts, welds, clamps, or other means. One or more cables, chain, or other elongate devices extending from the winch is secured at each lift arm. Pulleys may be used to route the cable and direct the angle of pull. Advancing the winch will cause tensioning of the elongate device and raise the one or more lift arms therein elevating the spool off the ground. In other forms, the support system may not include a mechanism for lifting or lowering a spool. Here the spool and its load is loaded from an elevated platform or lifted by hi-lo or other similar functional device on to the support system.

Figure 19:
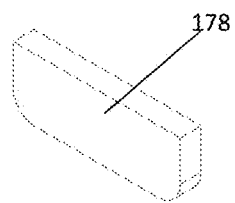

Illustrated further in FIGS. 14 and 19 is joiner block 178. The joiner block spans between the distal end of each outer forearm plate and across the distal end of each inner forearm plate. Secured by welds to these plates, the joiner 178 serves to reinforce the strength of the forearm assembly. The preferred embodiments shown above are manufactured from sheet metal for reduced cost, however parts of equivalent function are anticipated using other methods. For example, the lift arms and rod lock could be machined from a solid plate of steel thereby eliminating or minimizing the need for welding and assembly of plates.

Figure 30A:
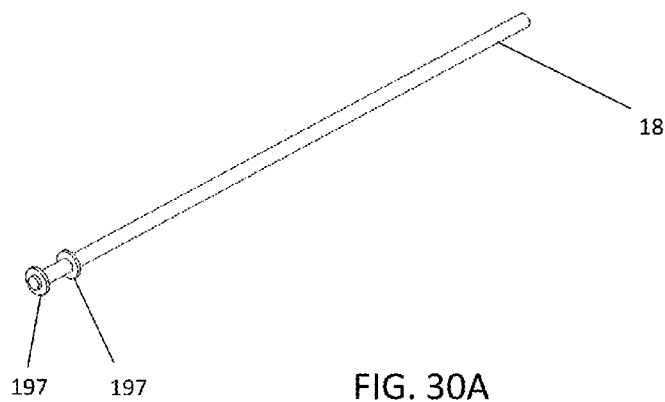
FIG. 30A is a perspective view of a spool rod with positioning stops in accordance with a form of the present invention.

Spool rod 18 may be modified to prevent the rod 18 from sliding out of rod channel 82. For example, as illustrated in FIG. 30A, a pair of rod stops 197 are secured to the spool rod 18. The rod stops 197 are spaced to provide sufficient room therebetween for a rod channel to fit. In this embodiment, the rod stops are in the form of locking collars or washers welded to the spool rod. In other embodiments set screws or threading may be used. In alternative embodiments the spool rod may take other forms such as a tube (FIG. 30B) or profiles other than round.

In preferred forms, a power arm 66 is utilized to control distance between proximal pivot hole 56 of the arm cradle 32 (FIG. 6, 8) and upper pivot aperture 180 therein causing the lift arms 24 to be raised or lowered. The power arm 66 in preferred forms is a hydraulic cylinder that shortens and lengthen based on the hydraulic pressure. The power arm may take other forms such as for example a pneumatic cylinder, a driven screw such as an acme drive screw, a system of cables and pulleys, or a geared mechanism.

Power unit 26 (FIG. 6) comprises an enclosure 188 and a power source enclosed therein (not shown) capable of changing the length of the power arm 66 against loads imparted on the system. For example, the power source may be in the form of a pneumatic or hydraulic pump or in the form of motor driven cables. The power source may operate through generation of its own energy (such as solar), fossil fuels (gasoline), energy generated by the user (i.e. cranking or pumping), or through energy supplied by the vehicle on which it is attached. For example, electrical power may be supplied by the transport vehicle to drive a hydraulic pump through a common seven prong electrical trailer connector available at the rear of the transport vehicle. Alternatively, a gas or propane driven engine or battery source may be included within the enclosure to the hydraulic pump. In yet another alternative, a hand lever may drive the pump or energy may be provided by a solar panel.

Figure 24:
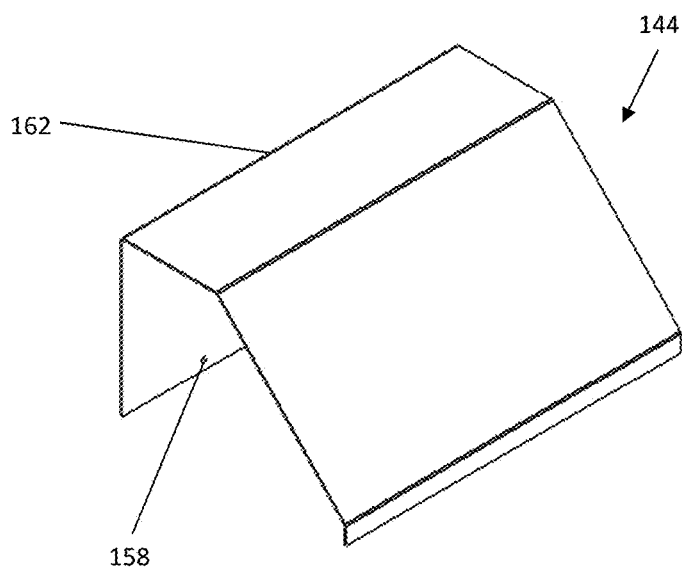
Figure 25:
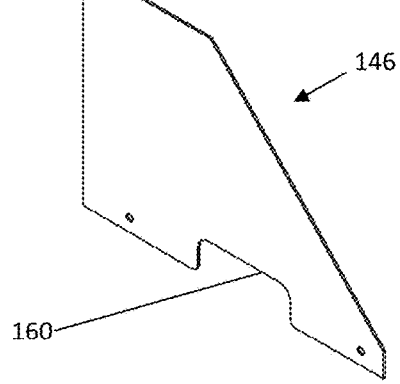
Figure 26:
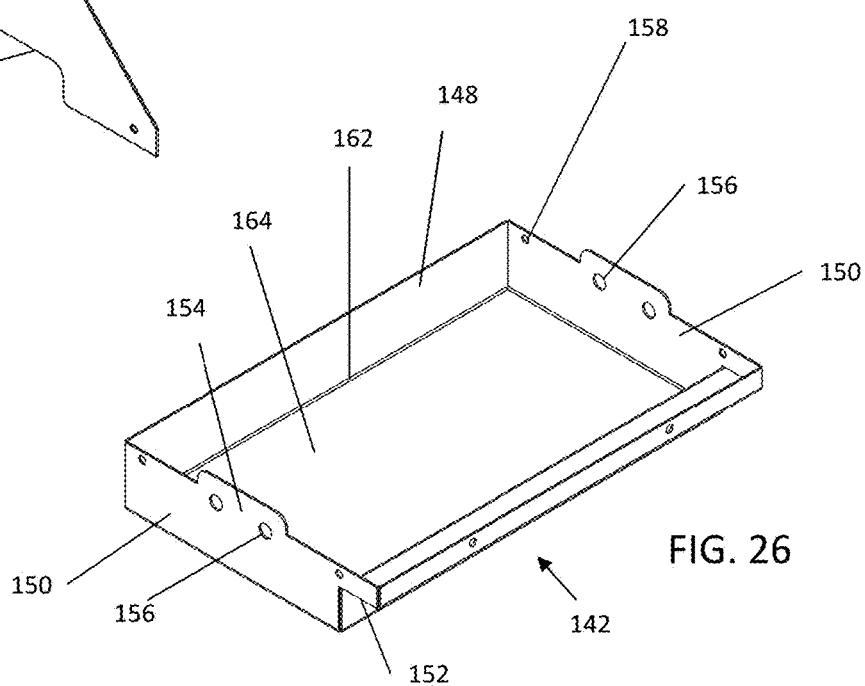

The power source enclosure 188 protects the power source from wind, rain, dust, and other elements of nature as well as from tampering. The enclosure may be manufactured from metals, composites or polymers, or similarly effective materials, however in this embodiment is manufactured from laser cut sheet metal. The enclosure comprises a pan 142 (FIG. 26) to enclose the bottom of the power unit, a pair of opposing power sides 146 (FIG. 25), and a power top 144 (FIG. 24). Portions of the enclosure may be removable for servicing the power source and portions of the enclosure may include vents to provide cooling of the power source. The enclosure may include apertures to pass control lines, power lines, or similar devices needed for effective operation and control. The power source enclosure is shaped not only to accommodate a power source within, but it may also be configured to fit in a predefined space within the lift system. For example, the power top 144 is sloped back in the embodiment of FIG. 24 to provide clearance for the spool 16 as seen in FIGS. 5A and 5B.

Pan 142 comprises a plurality of sheet metal bends forming a pair of opposing lateral panels 150, a proximal panel 148, a distal L-shaped panel 152, and a bulkhead plate 154 having one or more power holes 156. A plurality of securement holes 158 are placed about the enclosure to secure the panels to each other or to members of lift base 22 using screws, rivets, welds or other methods. In this embodiment, bottom panel 164 is supported by hitch strut 28. Proximal panel 148 is adjacent the proximal cross beam and L-shaped panel 152 cradles the distal crossrod. The bulkhead plate 154 provides a mounting surface for the hydraulic lines that extend through power holes 156 on their way to the adjacent power arm 66.

Power side 146 is used on each side of the enclosure and comprises a bulkhead window 160 to clear hydraulic fittings extending from the bulkhead plate 154. Power top 144 utilizes a plurality of sheet metal bends 162 to cover the remaining portions of the enclosure. Portions of the enclosure may include apertures. For example, these apertures may be used to pass control lines such as lift switches, to pass electrical connectors for connection to the vehicles power, for venting, to check fluid levels of the power unit, or to make other adjustments or repairs.

The power unit may be controlled by wired or wireless remote control or by controls located on the enclosure or elsewhere on the lift system. In some forms, the power unit may be controlled by controls mounted on the transport vehicle such as in the cab or bed of a truck. In one embodiment for example, lift controller 182 is illustrated in FIG. 4B. Here the lift controller is in the form of a wired switch that operates a hydraulic pump controlling the hydraulic power arm to lift and lower the lift arms.

The load rating of the transport vehicle and the trailer receiver 10 are considered before mounting the support system and adding loads. For example, class 5 trailer receivers handle tongue weights up to 1200 pounds or more whereas some class 3 hitches are limited to 600 pound tongue weight. The class 3 hitch may be suitable for example for a support system and spool cable having a combined weight of 500 lbs. A class 5 hitch may be suitable for example for a support system and spool of cable having a combined weight of 1000 pounds.

Figure 27:
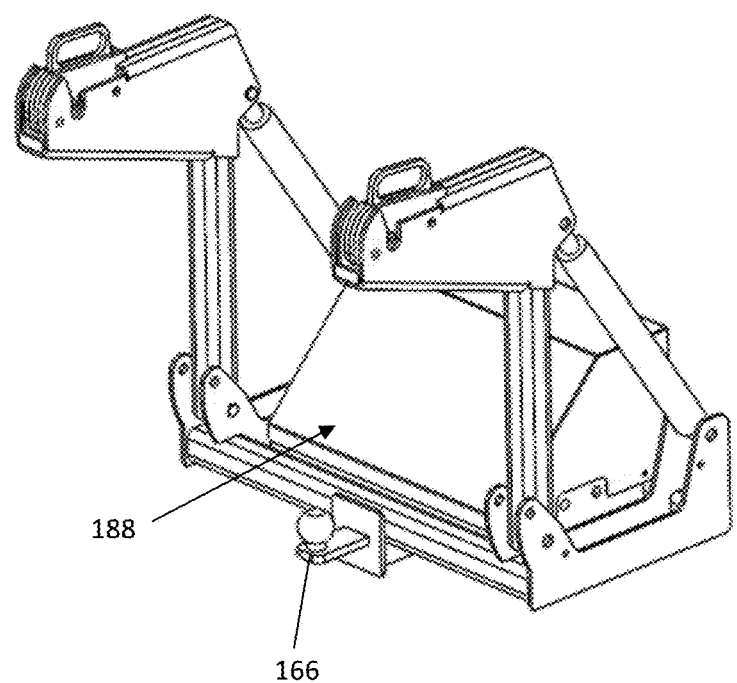

The lift base 22 may include a safety chain mount 190 for the attachment of trailer chains between the lift base and the hitch receiver of the transport vehicle or between the lift base and an attached trailer. This feature prevents separation of the mobile support system 20 in the event of hitch pin failure. As a further alternative, support system 20 may include a secondary hitch 166 (FIG. 27) mounted to lift base 22 by fasteners, welding, or other methods. In some forms the secondary hitch 166 is removable or permanently fixed to components of the lift base. The secondary hitch may take various forms such as ball style as illustrated in FIG. 27 or pintle style hitch plate 192 as illustrated in FIG. 28-29. In yet another alternative, a secondary hitch receiver tube (not shown) may be secured to the bottom of lift base 22. Various forms of hitches may be slipped into then pinned in the secondary hitch receiver tube. These options provide for the convenience of pulling an additional trailer while the mobile support system and lift 20 is attached to a transport vehicle. This additional trailer may carry additional cable spools or cable feeders. A trailer power bracket 199 may be used to secure an electrical connector to provide electrical energy.

Figure 3A:
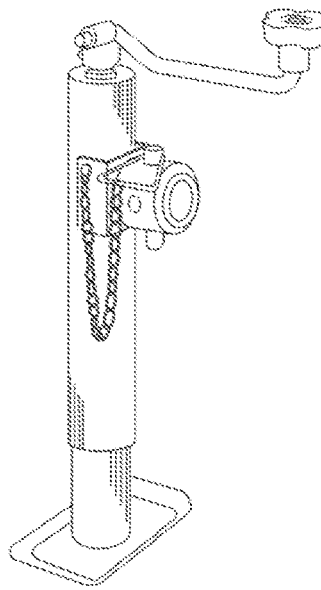
FIG. 3A is a perspective view of a pivot jack configured for rotation about a pivot base.
Figure 3B:
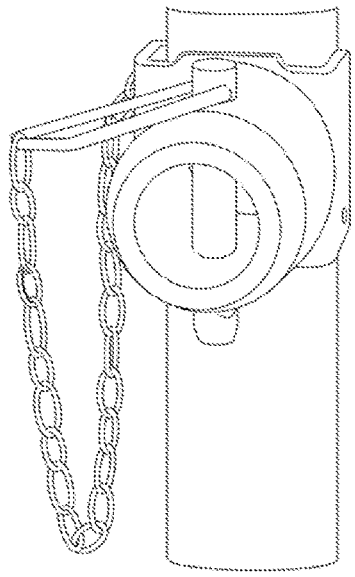
FIG. 3B is a close up perspective view of the pivot base.
Figure 3C:
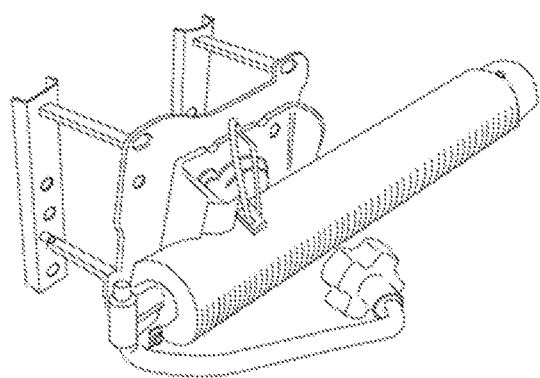
FIG. 3C is a perspective view of a pivot jack configured for bolting to a frame.

In some forms the support system and lift 20 comprises retractable and/or pivotable legs or jacks extending downward from lift base 22. Examples of jack from the prior art are illustrated in FIGS. 3A, 3B, and 3C. These jacks may serve as a stand when the support system and lift 20 is removed from the transport vehicle. In preferred embodiments, the jacks include wheels for eased transport of the support system from one location to another. The lift base 22 may comprise features for the mounting of jacks. For example, the jack in FIG. 3C may be configured to clamp around the medial and lateral plate of the support frame. In a preferred embodiment, a jack boss 196 is secured by weld to a portion of a lift base 22 as noted in FIG. 28-29. The jack boss 196 in this embodiment is in the form of a short cylinder with pin lock apertures 198 spaced 90 degrees. The pivot jack illustrated in FIGS. 3A and 3B mounts on the jack boss 196 and a locking pin on the pivot jack engages the apertures 198 to lock in position. The pivot jack is releasably locked between vertical lift positions and horizontal storage positions.

In some embodiments, handles are included on various portions of the support system and lift 20 to ease attachment and detachment of the support system and lift from the transport vehicle.

Figure 30B:
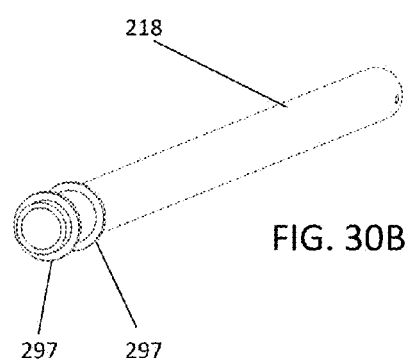
FIG. 30B is a perspective view of a spool rod in the form of an elongate tube.
Figure 31A:
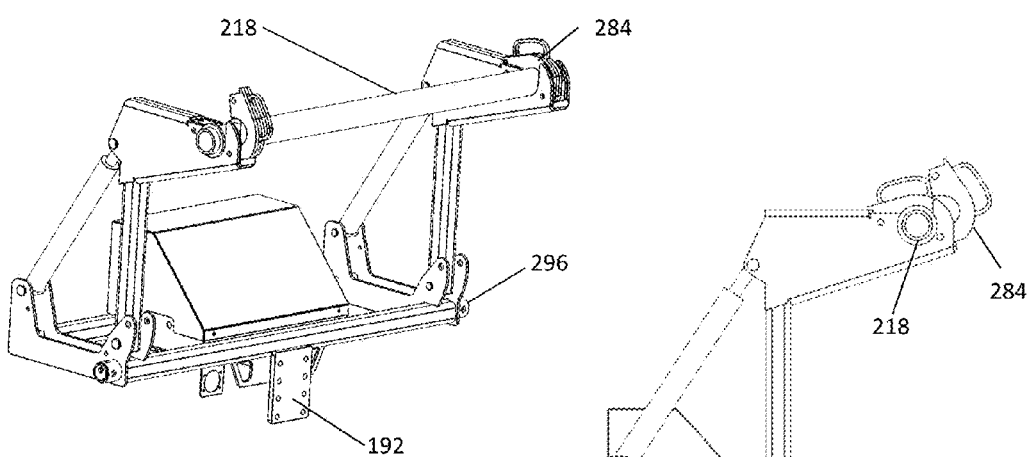
FIG. 31A is a perspective view of a preferred embodiment of a mobile support and lift system utilizing a spool rod in the form of an enlarged tube.
Figure 31B:
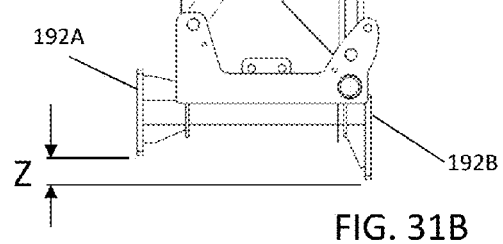

FIG. 31A illustrates the system modified for use with a tubular form of spool rod (FIG. 30B). In preferred embodiments, the tubular form of spool rod is defined by a larger outer diameter that reduces stress concentrations within the spool and provides an improved strength to weight ratio compared to a bar. It also eases rotation of the spool on the rod. In FIG. 31B, the primary hitch plate 192A is illustrated as offset a distance 'Z' from the secondary hitch plate 192B. The offset provides for level attachment of a trailer that normally sits lower than the frame of a transport vehicle. Both the primary and secondary hitch plates include pairs of vertically stacked bolt holes to provide further height adjustments.

In preferred embodiments, load supporting members of the system are manufactured from metals such as steels, stainless steels, other steel alloys, aluminum, and aluminum alloys. Other materials sufficient to carry the loads imparted on the system may also be used. Welds or fasteners or other common methods in the art may be used to join these parts. Paints, anodizing, and other methods in the art may be used to reduce corrosion and for aesthetic purposes. Grease fittings may be utilized at points of pivot to reduce friction and wear.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A mobile spool support system for transporting spools of a flexible elongate load on a transport vehicle comprising:
   a spool rod for supporting a spool containing a flexible elongate load disposed on said spool;
   one or more lift arms for raising and lowering said spool rod;
   said one or more lift arms comprising a power arm portion and stabilizer arm portion;
   a pivot bolt;
   each said power arm portion directly coupled to a said stabilizer arm portion by said pivot bolt;
   a rod channel;
   said rod channel disposed on a portion of said stabilizer arm portion;
   said spool rod removably seated within said rod channel and secured by a releasable rod lock to said stabilizer arm portion;
   a lift base for supporting loads placed on the mobile spool support system;
   said lift base comprising a central hitch strut;
   said one or more lift arms pivotally attached to said lift base;
   each of said one or more lift arms positioned laterally of said central hitch strut;
   a mount interface at one end of said hitch strut;
   wherein said mount interface and said hitch strut are shaped and sized to support and secure the entire support system weight and elongate load to the front or rear of a transport vehicle;
   and wherein in a lowered configuration said spool rod is lowered sufficiently to couple with a ground supported spool.

2. The mobile spool support system of claim 1 wherein a change in length of said power arm portion causes a change in height of said spool rod.

3. The mobile spool support system of claim 1 further comprising:
   a power source;
   wherein said power source imparts a force on said power arm to cause said power arm to change length.

4. The mobile spool support system of claim 2 wherein said power arm portion comprises at least one of a hydraulic cylinder and a pneumatic cylinder.

5. The mobile spool support system of claim 1 wherein said mount interface is located on at least one of a hitch plate and a hitch strut.

6. The mobile spool support system of claim 1 further comprising:
   a secondary hitch for attachment of a trailer to said lift base.

7. A mobile spool support system for transporting spools of a flexible elongate load on a transport vehicle comprising:
   a spool rod for supporting a spool containing a flexible elongate load disposed on said spool;
   one or more lift arms for raising and lowering said spool rod;
   said one or more lift arms comprising a power arm portion and stabilizer arm portion;
   said stabilizer arm portion comprising a rod channel;
   a lift base for supporting loads placed on the mobile spool support system;
   said lift base comprising a central hitch strut;
   said stabilizer arm portion pivotally attached to said lift base;
   each of said one or more lift arms positioned laterally of said central hitch strut;
   said spool rod removably seated within said rod channel and secured by a releasable rod lock to said stabilizer arm portion;
   a mount interface at one end of said hitch strut;

said mount interface and said hitch strut are shaped and sized to support and secure the entire support system weight and elongate load to the front or rear of a transport vehicle;

said power arm portion pivotably attached to said lift base and said stabilizer arm portion;

wherein said power arm portion and said stabilizer arm portion generally pivot within a common plane;

wherein a change in length of said power arm portion causes a change in height of said spool rod;

and wherein in a lowered configuration said spool rod is lowered sufficiently to couple with a ground supported spool.

8. The mobile spool support system of claim 7 further comprising:

a power source;

wherein said power source imparts a force on said power arm to cause said power arm to change length.

9. The mobile spool support system of claim 7 wherein said power arm portion comprises at least one of a hydraulic cylinder and a pneumatic cylinder.

10. The mobile spool support system of claim 7 wherein said mount interface to a transport vehicle is in the form of at least one of a hitch plate and a hitch strut.

11. The mobile spool support system of claim 7 further comprising a secondary hitch for attachment of a trailer to the support system.

12. The mobile spool support system of claim 7 further comprising a power source wherein said power source comprises at least one of a hydraulic pump and a pneumatic pump.

13. A mobile spool support system for transporting spools of a flexible elongated load comprising:

a spool rod for supporting a spool containing a flexible elongate load disposed on said spool;

one or more lift arms for raising and lowering said spool rod;

said one or more lift arms comprising a power arm portion and stabilizer arm portion;

a lift base for supporting loads placed on the mobile spool support system;

said stabilizer arm portion pivotably extending from said lift base;

a rod channel;

said rod channel disposed on a portion of said stabilizer arm portion;

said spool rod removably seated within said rod channel and secured by a releasable rod lock to said stabilizer arm portion;

said lift base comprising a central hitch strut;

said one or more lift arms pivotally attached to said lift base;

said lift base comprising a pair of generally horizontally spaced cross beams;

said central hitch strut positioned generally perpendicular to said pair of generally horizontally spaced cross beams;

said central hitch strut extending between said pair of generally horizontally spaced cross beams;

each of said one or more lift arms positioned laterally of said central hitch strut;

a mount interface at one end of said hitch strut;

wherein said mount interface and said hitch strut are shaped and sized to support and secure the entire support system weight and elongate load to the front or rear of a transport vehicle;

and wherein in a lowered configuration said spool rod is lowered sufficiently to couple with a ground supported spool.

14. The mobile spool support system of claim 13 wherein shortening or lengthening of said power arm raises or lowers said spool rod.

15. The mobile spool support system of claim 13 further comprising:

a power source;

wherein said power source imparts a force to cause said power arm to change length.

16. The mobile spool support system of claim 13 wherein said power arm portion comprises at least one of a hydraulic cylinder and a pneumatic cylinder.

17. The mobile spool support system of claim 13 wherein said mount interface to a transport vehicle is in the form of at least one of a hitch plate and a hitch strut.

18. The mobile spool support system of claim 13 further comprising a secondary hitch for attachment of a trailer.

19. The mobile spool support system of claim 13 further comprising a jack boss for attachment of a jack to stabilize the system on the ground.

20. The mobile spool support system of claim 15 wherein said power source is powered by electrical energy delivered from the transport vehicle.

* * * * *